US012621773B2

(12) United States Patent
Zourob et al.

(10) Patent No.: US 12,621,773 B2
(45) Date of Patent: May 5, 2026

(54) POWER MANAGEMENT FOR POWER-CONSTRAINED DEVICES

(71) Applicant: Telefonaktiebolaget LM Ericsson (publ), Stockholm (SE)

(72) Inventors: Mohammed Zourob, London (CA); Andreas Kristensson, Södra Sandby (SE); Gang Zou, Lund (SE); Andres Reial, Höllviken (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 837 days.

(21) Appl. No.: 17/904,118

(22) PCT Filed: Feb. 14, 2020

(86) PCT No.: PCT/EP2020/053970
§ 371 (c)(1),
(2) Date: Aug. 12, 2022

(87) PCT Pub. No.: WO2021/160291
PCT Pub. Date: Aug. 19, 2021

(65) Prior Publication Data
US 2023/0088942 A1     Mar. 23, 2023

(51) Int. Cl.
*H04W 52/02*          (2009.01)
*H04W 76/14*          (2018.01)
*H04W 88/04*          (2009.01)

(52) U.S. Cl.
CPC ...  *H04W 52/0245* (2013.01); *H04W 52/0261* (2013.01); *H04W 76/14* (2018.02); *H04W 88/04* (2013.01)

(58) Field of Classification Search
None
See application file for complete search history.

(56) References Cited

U.S. PATENT DOCUMENTS

| | | | |
|---|---|---|---|
| 11,082,815 B2 * | 8/2021 | Park | H04W 4/80 |
| 2014/0201109 A1 * | 7/2014 | Tilley | F24S 50/20 |
| | | | 700/297 |

(Continued)

FOREIGN PATENT DOCUMENTS

| | | |
|---|---|---|
| EP | 3606183 A1 | 2/2020 |

OTHER PUBLICATIONS

International Search Report and the Written Opinion of the International Searching Authority, issued in corresponding International Application No. PCT/EP2020/053970, dated Nov. 13, 2020, 9 pages.

(Continued)

*Primary Examiner* — Phirin Sam
(74) *Attorney, Agent, or Firm* — Rothwell, Figg, Ernst & Manbeck, P.C.

(57)          ABSTRACT

A method for power management of a first communication device, which has first power resources, comprises detecting a second communication device operating in a same area as the first communication device and having second power resources being less constrained than the first power resources. The method also comprises connecting to the second communication device over a non-cellular connection and delegating to the second communication device to perform cellular connection management measurements for the first communication device through cellular communication with a network node.

17 Claims, 5 Drawing Sheets

(56) References Cited

U.S. PATENT DOCUMENTS

2015/0350121 A1* 12/2015 Pandey ................... H04L 67/01
                                                   709/206
2017/0317889 A1* 11/2017 Moon ................. G06F 16/2365
2023/0396971 A1* 12/2023 Karabinis ................. H04L 5/04

OTHER PUBLICATIONS

Siekkinen et al. "How Low Energy is Bluetooth Low Energy? Comparative Measurements with ZigBee/802.15.4", IEEE, 2012, pp. 232-237.

* cited by examiner

| 1st device | 2nd device |
|:---:|:---:|
| M1 | M1 |
| Matching ||
| M2 | M2 |
| Matching ||
| M3 | M3 |
| Matching ||
|  | M4 |
|  | M5 |
| M6 | M6 |
| Matching ||
|  | M7 |
|  | M8 |
| M9 | M9 |
| Matching ||
|  | M10 |
|  | M11 |
| M12 | M12 |
| Matching ||
|  | M13 |
|  | M14 |
| M15 | M15 |
| Matching failed ||
| M16 | M16 |
| Matching ||
| M17 | M17 |
| Matching ||

POWER MANAGEMENT FOR POWER-CONSTRAINED DEVICES

CROSS REFERENCE TO RELATED APPLICATION(S)

This application is a 35 U.S.C. § 371 National Phase Entry Application from PCT/EP2020/053970, filed Feb. 14, 2020, designating the United States, the disclosure of which is incorporated herein by reference in its entirety.

TECHNICAL FIELD

The present invention relates generally to the field of wireless communication. More particularly, it relates to power management for devices with limited power resources operating in wireless communication networks.

BACKGROUND

In typical wireless communication networks of today each cellular connected User Equipment (UE) or wireless communication device, which may be either power-constrained (e.g. a UE powered by a battery and with an expected lifetime of 1 day (smartphones) to 10 years (Internet of Things, IoT) or less power-constrained (e.g. a UE powered using a power cable), typically has to carry out connection management activities besides the common data reception and transmission. For example, the connection management dictated by the 3GPP (third generation partnership project) includes: cell search, measurement and selection; network system information (MIB(management information block)/SIB(system information block)) reception and decoding; paging reception; RACH (Random Access Channel) process . . . etc. Those activities are typically performed with different periodicity based on the different devices' tasks and duties and they are typically performed regardless of the energy capacity of the communication device.

A large fraction of UEs, broadly belonging to the class of massive Machine Type Communication (mMTC) and Narrow Band Internet of Things (NB-IoT) devices, typically has a limited amount of data to send/receive and data transmission occurs infrequently. Some examples of such devices are stationary or mobile sensors, tracking devices, etc. Such UEs spend limited time in connected mode but remain mostly in idle or inactive modes where they should perform idle mode RRC (Radio resource control) measurements for camping and tracking area updates, as well as for paging monitoring. Even if configured with long DRX (discontinuous reception) cycles (e.g. 2.56 s), the total energy consumption is typically dominated by idle/inactive mode periodic activities that do not lead to further actions—the camping cell remains unchanged and there is no paging information to the UE.

Today, solutions exist to offload data traffic from the cellular connection of a UE and focus on freeing up bandwidth for other users or provide better reception in cases of poor cellular coverage of a given UE. Such solutions generally do not address power or energy consumption reduction and do not take into consideration the fact that there are use cases where a lot of the 3GPP-mandated operations mentioned above at the device side would still result in a relatively unchanged amount of information transmitted/received by the UE, at least in certain conditions. In addition, data offloading solutions typically come with privacy and security concerns. Such solutions are beneficial in cases of high data rate traffic between the device and the network, but it is not very beneficial in the case of IoT devices that will be transmitting once a day, a week or a month (based on how it is configured). In the IoT case, the relative power consumption associated with the device's control channel is comparable to the data channel, since measurements are required all the time while data is transmitted occasionally. Hence, data offloading solutions will not benefit the IoT case.

Therefore, there is a need for methods and arrangements for power management of power constrained devices in wireless communication networks.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like. It is an object of some embodiments to solve or mitigate, alleviate, or eliminate at least some of the above disadvantages and to provide methods and arrangements (i.e. apparatuses) for power management of a power constrained device.

According to a first aspect this is achieved by a method for power management of a first communication device. The communication device has first power resources and the method comprises detecting a second communication device operating in a same area as the first communication device and having second power resources being less constrained than the first power resources.

The method also comprises connecting to the second communication device over a non-cellular connection and delegating to the second communication device to perform cellular connection management measurements for the first communication device through cellular communication with a network node.

The method also comprises receiving information associated with the connection management measurements from the second communication device through the non-cellular connection.

In some embodiments, the method may comprise comparing information associated with connection management measurements previously gathered by the first communication device and the received information associated with the connection management measurements and determining whether the received information is applicable for the first communication device.

In some embodiments, when it is determined that the received information is not applicable for the first communication device, the method may comprise disconnecting from the second communication device, performing connection management measurements over the cellular connection to the network node and searching for a third communication device with less constrained power resources than the power resources of the first communication device for connecting to.

In some embodiments, wherein when it is determined that the received information is applicable for the first communication device, the method may comprise staying connected to the second communication device and receiving further information associated with connection management measurements from the second communication device over the non-cellular connection.

In some embodiments, the connection management measurements comprise one or more of Radio Resource Management, RRM, measurements; paging reception; cell search; network system information reception; cell measurement and selection; Random Access Channel, RACH, processes; and control signalling.

In some embodiments, the first communication device is an Internet of Things, IoT, Reduced Capability, RedCap, or massive machine type communication, mMTC, device.

In some embodiments, the first power resources are limited based on one or more of a size of a battery powering the first communication device, limited connectivity, available radio resources and physical location of the first communication device.

In some embodiments, the method may comprise refraining from performing a subset of connection management measurements while connected to the second communication device.

In some embodiments, the method may comprise receiving an indication from the second communication device of a need for cell change or change of tracking area and using the received indication, or performing corresponding RRM measurements, for initiating a cell change or change of tracking area.

In some embodiments, the indication is a neighbour-cell quality metrics obtained by the second communication device when the second communication device performs RRM measurements and determines a need for a camping cell change or change of a tracking area.

In some embodiments, the method may comprise informing the second communication device of paging occasion information and a Paging Radio Network Temporary Identifier, P-RNTI, associated with the first communication device, wherein the P-RNTI enables the second communication device to receive and decode paging information for the first communication device. The method may also comprise enter a power saving state and receiving an instruction from the second communication device to leave the power-saving state to receive cellular control data when there is a paging message for the first communication device.

In some embodiments, the method may comprise receiving cellular control data from the second communication device through the non-cellular connection; or in some embodiments, it may comprise establishing the RRC connection to the network node by performing the RA procedure and receiving the cellular control data directly from the network node over the cellular connection.

In some embodiments, the cellular control data is broad casted system information.

In some embodiments, the non-cellular connection is one of a Bluetooth connection, a Bluetooth Low Energy, BLE, connection, a NFC connection, a Wi-Fi connection, a D2D-connection, a M2M-connection and a cable connection.

A second aspect is a method of a second communication device for power management of a first communication device. The first communication device has first power resources and the second communication device has second power resources being less constrained than the first power resources. The method comprises connecting to the first communication device over a non-cellular connection, performing cellular connection management measurements for the first communication device through cellular communication with a network node and transmitting information associated with the performed connection management measurements to the first communication device through the non-cellular connection.

In some embodiments, the connection management measurements comprise one or more of Radio Resource Management, RRM, measurements; paging reception; cell search; network system information; measurement and selection; Random Access Channel, RACH, processes; and control signalling.

In some embodiments, the second power resources receives power from a power grid.

In some embodiments, the method may comprise performing mobility management measurements while connected to the first communication device.

In some embodiments, the method may comprise performing Radio Resource Management, RRM, measurements and determining based on the RRM measurements neighbour-cell quality metrics and a need for a camping cell change or change of a tracking area and transmitting the neighbour-cell quality metrics to the first communication device.

In some embodiments, the method may comprise receiving from the first communication device information indicative of paging occasion information and a Paging Radio Network Temporary Identifier, P-RNTI, associated with the first communication device. The method may also comprise receiving and decoding paging information over the cellular connection for the first communication device based on the received information, determining whether there is a paging message for the first communication device and transmitting an instruction to the first communication device to leave the power-saving mode to receive cellular control data.

In some embodiments, the method may comprise performing a Random Access, RA, procedure for establishing a cellular Radio Resource Control, RRC, connection to the network node and transmitting cellular control data from the network node to the first communication device over the non-cellular connection.

A third aspect is a computer program product comprising a non-transitory computer readable medium. The non-transitory computer readable medium has stored there on a computer program comprising program instructions. The computer program is configured to be loadable into a data-processing unit, comprising a processor and a memory associated with or integral to the data-processing unit. When loaded into the data-processing unit, the computer program is configured to be stored in the memory. The computer program, when loaded into and run by the processor is configured to cause the execution of method steps according to any of the methods described in conjunction with any of the first and second aspect.

A fourth aspect is an arrangement of a first communication device for power management. The communication device has first power resources and the arrangement comprises controlling circuitry. The controlling circuitry is configured to cause detection of a second communication device operating in a same area as the first communication device and having second power resources being less constrained than the first power resources and connection to the second communication device over a non-cellular connection. The controlling circuitry is also configured to cause delegation of the second communication device to perform cellular connection management measurements associated with the first communication device through cellular communication with a network node and reception of information associated with the cellular connection management measurements from the second communication device through the non-cellular connection.

A fifth aspect is an arrangement of a second communication device for power management of a first communication device. The first communication device has first power resources and the second communication device has second power resources being less constrained than the first power resources. The arrangement comprises controlling circuitry configured to cause connection to the first communication device over a non-cellular connection. The controlling circuitry is also configured to cause performance of cellular connection management measurements associated with the first communication device through cellular communication with a network node and transmission of information associated with the performed connection management measurements to the first communication device through the non-cellular connection.

A sixth aspect is a communication device comprising the arrangement according to either of the fourth or fifth aspect.

In some embodiments, any of the above aspects may additionally have features identical with or corresponding to any of the various features as explained above for any of the other aspects.

An advantage of some embodiments is efficient power management for a device having constrained power resources are enabled by offloading communication procedures relating to cellular measurements from the constrained device.

Another advantage of some embodiments is that the expected life span of the power constrained device is increased.

BRIEF DESCRIPTION OF THE DRAWINGS

Further objects, features and advantages will appear from the following detailed description of embodiments, with reference being made to the accompanying drawings, in which:

FIG. 4 illustrates table 1 according to some embodiments;

DETAILED DESCRIPTION

Figure 1:
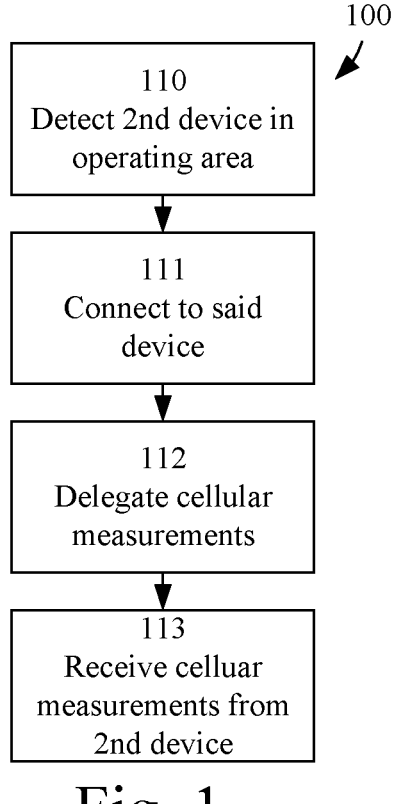
FIG. 1 is a flowchart illustrating example method steps according to some embodiments.

In the following, embodiments will be described where power management for power constrained devices is enabled by offloading some of the cellular connection management measurements to a device which has less power constraints than the power constrained device. Furthermore, it should be noted that the term UE may be used interchangeably with the term communication device, or just simply device, in this disclosure.

According to some embodiments described herein, the UEs with limited power resources, i.e. a power constrained device, may use devices with stronger computation capabilities, greater power resources, and/or better data TX/RX capabilities or conditions (i.e. devices with less constrained power resources) to generally handle cellular connection-related procedures and signalling (primarily not data transmissions). One aspect is the mobility configurations and parameters and idle/inactive-mode paging monitoring.

Furthermore, in this disclosure, cellular connection may refer to e.g. 3GPP technologies like LTE (Long Term Evolution) and NR (New Radio). The information exchange with the NW (network) and related processing activities can be delegated to the less constrained device and then used for decision making by the NW concerning the constrained device(s), as well as in the less constrained devices themselves.

The power constraints may typically be dynamically set by the environment/conditions by either having a limited power resource, running low on power, or being a UE that is expected to run for a very long time (for example: IoT devices that are permanently or for an extended time placed in the vicinity of a less power constrained device. Poor link conditions of the constrained device due to bad positioning/placement of the device, necessitating e.g. high-power transmission in the UL, also motivate the use of assistance from the less constrained device.

Some general approaches for reducing UE transmission power and improve coverage, some processing load offloading frameworks may typically be formulated as data offloading solutions that focus on offloading data traffic from the cellular network to other radio access technologies such as Wi-Fi, e.g. in cases of poor link quality or to free cellular bandwidth for other users. Moreover, some solutions where sensors and meters are installed and configured to transmit to a gateway that is in close range may be envisioned. In that case, the sensors and meters can spend minimum transmission power using non-cellular technologies and the gateway takes care of delivering the information to the NW (network).

One approach allowing some degree of power reduction is e.g. to install a repeater that would re-transmit messages from a power-constrained UE (PC-UE) to the base station, thus allowing operation with reduced output power. However, in that case, the UE would still need to perform the processing to create the message, and the message from the PC-UE to the repeater would still typically have to be transmitted using a 3GPP technology (e.g. LTE or New Radio, NR). That would mean e.g. performing signal demodulation and/or measurements and/or and switching on the cellular transmitter and its power amplifier, which is a dominant contributor to power and energy consumption, and hence the problem of managing power resources in constrained devices remain.

When it comes to solutions where sensors transmit to a gateway using non-cellular technology and the gateway transmits to the network (NW) using cellular technology, there are typically three main problems. The first would be privacy, as the metered or sensed information might be sensitive to the network operator, while the gateway is being managed by the gateway provider. In cases of privacy, the gateway could be managed by the network operator, but the operator might still be required to buy the sensors and meters from the same gateway provider/vendor to ensure compatibility and smooth operation, which would limit the client's options and indirectly give control to the vendor. The third problem would be that the gateways would represent a single point of failure. If the gateway goes down, then the whole system/NW goes down. This could be considered catastrophic in cases of time-sensitive data.

Since the above approaches do not relieve idle/inactive mode energy consumption for the above mentioned non-eMBB (enhanced Mobile Broadband) UE types, there is a need for an approach to offload NW protocol- and connection management-related signaling from UEs cellular transceiver to reduce the energy consumption of such UEs.

FIG. 1 illustrates a method 100 for power management of a first communication device, wherein the communication device has first power resources. The method start in step 110 with detecting a second communication device operating in a same area as the first communication device and having second power resources being less constrained than the first power resources. A same area as the communication device may e.g. relate to one or more of operating in the same network cell, or adjacent network cells, operating physically close to each other such as between 1 cm (or less) up to 100 m.

The first device may e.g. operate on a battery and may not have the ability replenish its energy resource, whereas the second device may be connected to a power outlet and hence continuously receive power from e.g. a power grid. In some embodiments, the first power resources are limited based on one or more of a size of a battery powering the first communication device, limited connectivity, available radio resources and physical location of the first communication device. In some embodiments, the first communication device is an Internet of Things, IoT, or massive machine type communication, mMTC, device. In some embodiments, the first communication device is a smart phone or other type of wireless communication device with limited power supply. The smart phone may e.g. lack a cable for connecting it to the power grid, and may hence not be able to charge its battery and thus replenish its energy resources.

The method then continues in step 111 with connecting to the second communication device over a non-cellular connection. The first and second device may e.g. connect to each other through wi-fi (IEEE802.11) or Blue Tooth.

In step 112, the method comprises delegating to the second communication device to perform cellular connection management measurements associated with the first communication device through cellular communication with a network node. In step 113 the method comprises receiving information associated with the connection management measurements from the second communication device through the non-cellular connection. The term delegating may in this disclosure be seen as the first device putting the responsibility of acquiring measurements on the second device either by directly requesting the second device to perform and share the measurements or simply through normal operation of the second device (i.e. sharing the cellular measurements that are carried out by the second device regardless of a connection to the first device).

The method as described in conjunction with FIG. 1 enables a first power constrained device to utilise the connection management measurements performed by a second device which does not have the same constraints in terms of power as the first device. The second device performs the power requiring measurements, and the first device use the outcome of those measurements for its own cellular connectivity management.

In some embodiments, the connection management measurements comprise one or more of Radio Resource Management, RRM, measurements; paging reception; cell search; network system information; measurement and selection; Random Access Channel, RACH, processes; and control signalling.

In order to ensure that the connection management measurements that are performed by the second device is actually applicable to the first device some measurement matching may be carried out. Measurements may e.g. not be applicable to the first device due to that the second device communicates with a network node which is not catering the first device, or that some of the measurements simply does not apply to the first device. The matching may also be done in order to ascertain that timing and offset between the network node and the first device is up to date. The measurements of the second device may also be incompatible with the first device based on e.g. device orientation and design, antenna directivity differences between the devices, receiver sensitivity differences, etc.

Figure 2:
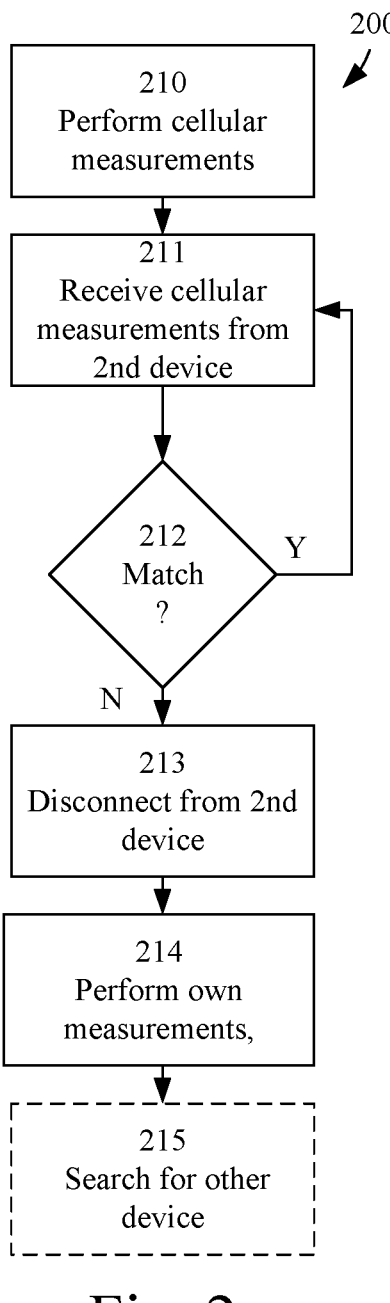
FIG. 2 is a flowchart illustrating example method steps according to some embodiments.

FIG. 2 illustrates an example method 200 according to some embodiments. The example method 200 may be incorporated with the method 100, the step 211 may e.g. be the same as the step 113, whereas the step 210 may take place anywhere prior to the step 113 or in conjunction with step 112.

In step 210, the method comprises performing or gathering cellular connection management measurements. The first device may e.g. set up a cellular connection towards a network node and perform connection management measurements as well as possibly setting up a non cellular connection towards the second device.

Then in step 211, the first device may receive cellular connection management measurements from the second device (compare with steps 112 and 113 of the method 100).

In step 212, the method comprises comparing information associated with connection management measurements previously gathered by the first communication device and the received information associated with the cellular connection management measurements and determining whether the received information is applicable for the first communication device (i.e. if there is a match between the measurements).

When it is determined that the received result is not applicable for the first communication device (N-path out of 212), the method continues in step 213 with disconnecting from the second communication device and in step 214 with performing connection management measurements over the cellular connection to the network node. The disconnecting may e.g. in some embodiments relate to disconnecting the cellular connection to the second device. In some embodiments the disconnecting may relate to disconnecting the delegation of measurements to the second device, while still keeping the non-cellular connection. Disconnecting the cellular connection may save power in some embodiments. It should also be noted that in some embodiments, more than one determination that the measurements are not applicable may be needed prior to the first device performing the disconnection (especially in terms of disconnection of the non-cellular connection). A advantage with keeping the non-cellular connection even though a mismatch has been detected is that it can easily be checked over time if the mismatch disappears, and the delegation can start again.

Hence if a mismatch between cellular connection management measurements that was gathered by the first device itself and cellular connection management measurements that was received from the second device is detected, the first device may decide that the measurements performed by the second device is for the time being not reliable and/or applicable to the first device. The first device may in such case disconnect the non-cellular connection with the second device and perform the cellular connection management measurements against the network node on its own end. Furthermore, the method 200 may optionally comprise in step 215 that the first device keeps searching for a third communication device with less constrained power resources than the power resources of the first communication device for connecting to. It may e.g. search for beacons from devices with less constrained power resources.

The third device may e.g. be the second device, but at a later stage of time. Or it may be a completely different device that operates in the same operating area as the first device.

In some embodiments, when it is determined that the received information is applicable for the first communication device (Y-path out of 212), the method 200 loops back to step 211 where the first communication device stays connected to the second communication device and receives further information associated with connection management measurements from the second communication device over the non-cellular connection.

It should also be noted that connection to the second device in this disclosure does not have to relate to an actual non-cellular connection. It may also be that the first device "is connected" to the second device by simply listening to beacons broadcasted from devices with less power constraints, and use the information relayed in these beacons for performing cellular connection management.

In FIG. 2 the method 200 is illustrated such that for as long as there is a match between previously gathered information and received information associated with connection management measurements, the connection between the two devices is maintained and a match between measurements is made for every received measurement. Performing matching for each measurements is of course beneficial in that it ensures that the received measurements are applicable to the first device and smooth connection management is enabled. However, in terms of power saving it is not very beneficial to perform measurement matching for each measurement. Hence, in some embodiments the method 100 and/or 200 may comprise that the first communication device refrains from performing a subset of connection management measurements while connected to the second communication device. Matching may hence be performed for only a subset of the connection management measurements received form the second device.

Figure 3:
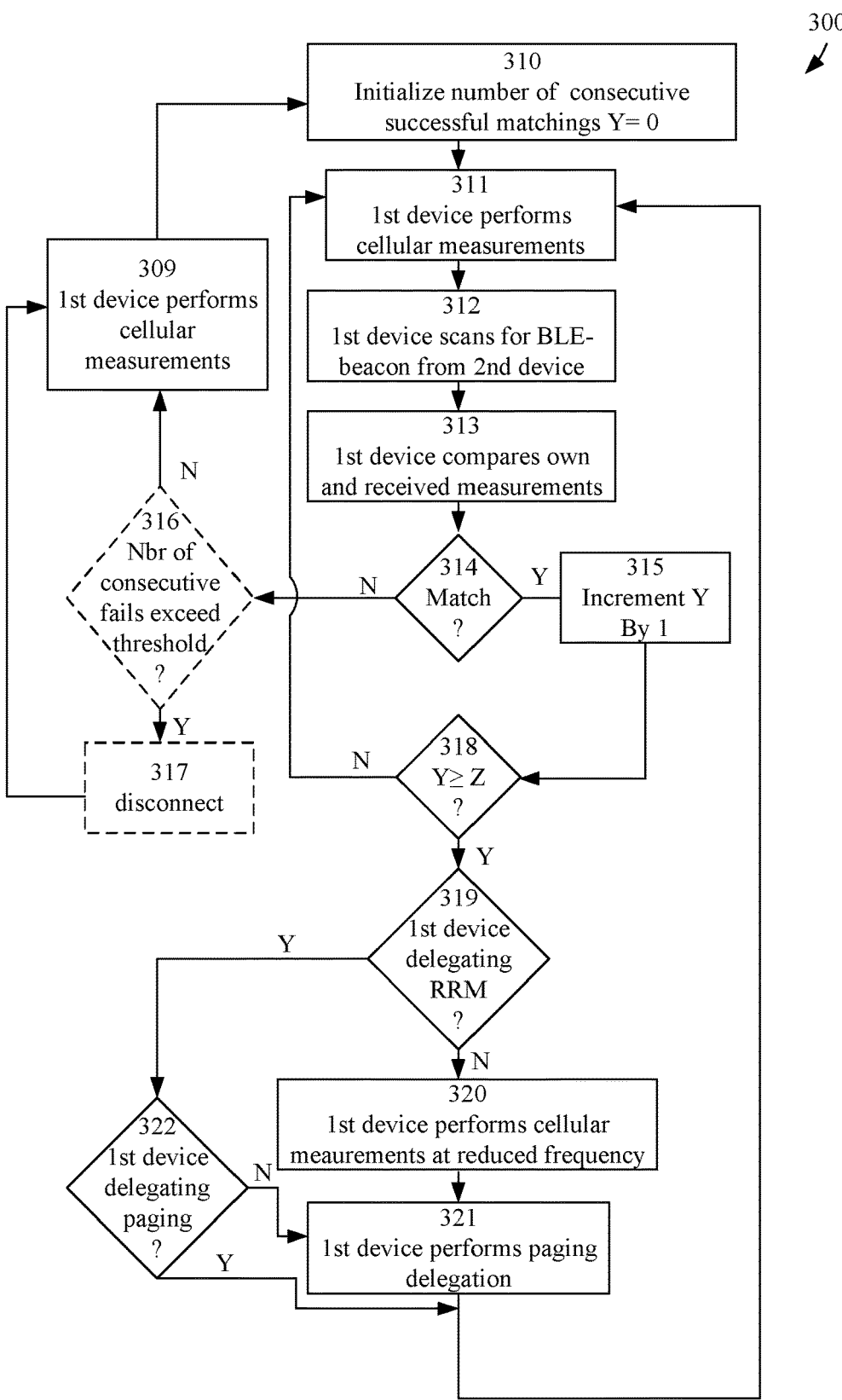
FIG. 3 is a flowchart illustrating example method steps according to some embodiments.

This procedure will be described in further detail in conjunction with FIG. 3. FIG. 3 illustrates a method 300 according to some embodiments. The method 300 may be combined with any of the previously described methods 100 and 200, and may be carried out by a first communication device in cooperation with a second communication device as previously described in conjunction with FIGS. 1 and/or 2.

The method may start in step 309 where the first device performs cellular measurements against a network node.

Then the method continues in step 310 where the first device initialize a number of consecutive matches Y. Hence for each match, the first device has gathered cellular connection management measurements through a cellular connection to a network node (step 309 has been illustrated as taking place prior to step 310, however, steps 309 and 310 may be seen as a single step, which may also comprise the following steps 311-312) and compares these to cellular connection management measurements that have been received from a second device over a non-cellular connection which second device has less restrictions in terms of power resource than the first device. The number of consecutive matches Y which should be successful (compare to step 211-212 of method 200) may amount to an integer Z. Z may be determined beforehand, or may be dynamically set based on network conditions such as congestions, time of day, connectivity, SINR (signal to noise ratio), cell size etc. As a rule of thumb, Z should not be set so large as to inhibit the power saving advantages of the methods proposed herein, but also not so low as to jeopardize reliability of communication and network security between the first device and the network node. An example of Z may e.g. be an integer between 2 and 5.

Thus, in step 311, a first match is initiated by the first device performing cellular connection management measurements over a cellular connection with a network node (the measurements obtained in step 311 may e.g. correspond to the measurements obtained in step 309. In some embodiments, the measurements obtained in step 311 may differ from the measurements obtained in step 309). Then in step 312, the first device searches for a second device having a power resource that is less constrained than the power resource of the first device (steps 311 and 312 may in some embodiments be carried out in parallel or simultaneously, or step 312 may be performed prior to step 311). The first device may e.g. scan for Blue Tooth Low Energy (BLE) beacons from a second device. It should be noted that BLE is just an example and other non-cellular connections are possible. The non-cellular connection may e.g. in some embodiments be one of a Bluetooth connection, a Bluetooth Low Energy connection, a NFC (Near Field Communication) connection, a Wi-Fi connection, a D2D (Device to Device) connection, a M2M (Machine to Machine) connection and a cable connection. The first device may connect to the second device and receive from the second device cellular connection management measurements associated with the first device but performed by the second device.

Then in step 313, the first device compares its own gathered connection management measurements with the received connection management measurements (compare with steps 113 and 211 of method 100 and 200 respectively). In step 314 the first device determines whether the own measurements matches with the received measurements (i.e. whether the received measurements applies to the first device and can be used by the first device).

When it in step 314 is determined that there is a mismatch between the own and the received measurements (i.e. the received measurements cannot be used by the first device for connection management) the method may continue to step 316 where it is determined whether a number of consecutive failed matches (i.e. mis-matches) exceeds a threshold. The threshold may be dynamically set, and vary based on different parameters. Such parameters may e.g. be power saving requirements of the first device, network topology, a speed which the device is traveling at, etc. The threshold may e.g. be set to 3, 5 or 10 consecutive fails. Other integer values are contemplated.

When in step 316 it is determined that the number of consecutive fails have exceeded the threshold (N-path out of 316), the method may continue in step 317 where the second device disconnects from the first device. The disconnection may e.g. mean that the first device ends its non cellular connection with the second device, and/or that it stops analysing the beacons of the first device (i.e. disconnect from the sharing of measurements with the second device). The disconnection does not have to be permanent. The first device may e.g. wait for a period of time and then utilize the beacons of the second device again and/or at least determine whether the cellular measurements of the second device are applicable on the first device according to e.g. the method 300.

When in step 316 it is determined that the number consecutive fails does not exceed the threshold, the method may continue in step 309 where the first device reverts back to normal operation, i.e. performs own cellular measurements but may still maintain a connection to the second device (e.g. a non cellular connection or that it just keeps listening to the beacons of the second device). The method may then continue in step 310.

It should be noted that steps 316 and 317 are optional, and the method may continue from step 314 directly to step 310 if a mis-match is determined. When in step 314 it is determined that there is a match between the own measurements and the received measurements, the method may continue in step 315 where Y is incremented by 1.

Then in step 318 the first device may determine whether the recently performed match Y equals or exceeds the above mentioned Z in order to determine whether a satisfactionary amount of successful measurement matches have been performed. When it is determined that Y does not equal Z, it may be determined that the measurements of the second device are not yet seen by the first device to be entirely reliable, and the method 300 may loop back to step 311 where it gathers connection management measurements over a cellular connection with a network node.

When in 318 it is determined that Y equals or exceeds Z (Y-path out of 318) it may be deduced by the first device that the second device performs applicable and reliable measurements and that it may use those measurements without risking a reliable communication with the network node, the method may thus continue in step 319 where the first device checks whether it is delegating the performance of RRM (Radio Resource Management) measurements to the second device already. Hence, in some embodiments, if RRM measurements associated with the first device have been delegated to the second device (i.e. the second device performs the RRM measurements for the first device and possibly shares them with the first device over the non-cellular connection) the method may comprise receiving an indication from the second communication device of a need for cell change or change of tracking area and using the received indication, or performing corresponding RRM measurements, for initiating a cell change or change of tracking area. In some embodiments, the indication is a neighbour-cell quality metrics obtained by the second communication device when the second communication device performs RRM measurements and determines a need for a camping cell change or change of a tracking area. In some embodiments, the received indication may be an instruction for the first device to perform a cell change or change of tracking area.

When in step 319 it is determined that the first device is not delegating RRM measurements to the second device (N-path out of 319), the method continues in step 320 with the first device reducing the frequency of which it performs own cellular measurements (and thus also matching) and instead relies more on the received cellular measurements for connection management. In step 320 power saving may be achieved since the first devices does not have to perform all of the intended cellular connection management measurements which are power consuming but can instead have the second device to perform cellular measurements and share the outcome with the first device. The first device can either request the outcome from the second device, or the second device can broadcast information associated with performed cellular connection management measurements related to the first device as broadcasted system information.

The first device may hence in accordance with step 320 perform at set of cellular measurements on its own and compare these with received cellular measurement from the second device (cellular measurements in this disclosure is taken to comprise cellular connection management measurements and/or cellular control measurements and may hence be used interchangeably) in order to determine that the received measurements (or received outcome of performed cellular measurements) are still applicable to the first device according to the described steps 310-318.

In some embodiments, the matching performed according to method step 320 (i.e. such as described for step 310-318) may have a different value on Z, Z may e.g. be set to 1, 2 or 3 since it is fairly likely that the received measurements are applicable. Similarly, by reduced frequency it is meant that the first device reduced the number of times it performs own measurements, and thus also the number of times it performs matchings. This leads to that when the first device carries out the method 300 according to FIG. 3, and arrives at step 320, power saving may be achieved since the first device can reduce the number of cellular measurements which it performs on its own, and instead receive these measurements through a non-cellular connection with the first device.

In some embodiments, if a matching during method step 320 is determined to be a mis-match (failed match) the method may continue directly to optional step 317, where the first device disconnects from the second device.

In some embodiments, the threshold according to step 316 may be set lower when the method as reached 320, than at the initial start of the method 300. Hence, when the first device has achieved a power saving state (i.e. most of the cellular measurements are performed by the first device with less limited power resources) the number of failed consecutive matchings leading up to a disconnection may be less than if the first device has not reached the power saving state.

In some embodiments, it may be reversed, such that the threshold for number of failed consecutive matchings is increased when the first device has reached the power saving state according to step 320.

Then the method continues in step 321 with the first device performing paging delegation towards the second device. The method may e.g. in some embodiments comprise the first device informing the second communication device of paging occasion information and a Paging Radio Network Temporary Identifier, P-RNTI, associated with the first communication device. The P-RNTI enables the second communication device to receive and decode paging information for the first communication device. The first communication device may then enter a power saving state. The first communication device may e.g. enter sleep mode or inactive mode in which modes the first communication device is set on "stand-by", i.e. it does not transmit or receive signals. The second device may then act as stand in for the first device in view of the network node, as well as a stand in for the network node in view of the first device. The method may further comprise the first device receiving an instruction from the second communication device to leave the power-saving mode to receive cellular control data when the second communication device determines that there is a paging message for the first communication device. Hence, according to some embodiments, the first device will only have to leave the power saving mode when there actually is a paging for it, and does not have to check in every now and then in order to see if the network node has anything to communicate. Thus, power can be conserved further for the power limited first device.

When the first device receives an instruction to leave the power saving mode to receive cellular control data, the method may comprise the first device receiving cellular control data from the second communication device through the non-cellular connection. The second communication device may in such case perform a Random Access, RA, procedure for establishing a cellular Radio Resource Control, RRC, connection to the network node. Hence the second device may perform the power consuming cellular establishment and then relay to the first device the necessary information to maintain the established connection. In some embodiments, the first device may establish (on its own) the RRC connection to the network node by performing the RA procedure and receiving the cellular control data directly from the network node over the cellular connection.

In some embodiments, the cellular control data is broadcasted system information. The cellular control data may e.g. be broadcasted by the network node and/or the second device.

When, in step 319 of the method 300 it is determined that the first device is delegating RRM according to the above (Y-path out of 319) the method may continue in step 322 where the first device determines whether it is delegating paging to the second device (compare with step 321). When it is determined that the first device is not delegating paging (N-path out of 322) the method may continue in step 321 with sharing paging information as described above with the second device. When in step 322 it is determined that the first device is delegating paging to the second device (Y-path out of 322) the method may continue in step 311.

It may be noted that in method 300, when in step 318 it is determined that the number of consecutive matchings Y are equal or greater to Z, the first device may determine that it can (at least for now) rely on the cellular measurements of the second device and may enter a power saving mode where less cellular measurements are performed by the first device. When this state has been reached or it may be possible for the first device to enter this state (i.e when Y>=Z), the method may comprise in step 319 that the first device also delegates RRM and paging to the second device. Hence in some embodiments, the steps 319 and 322 may be combined into one step following the Y path out of 318, and after delegation of paging and RRM, the method continues in step 320 where the first device enters the power saving mode and performs cellular measurements at a lower frequency and instead relies more on the cellular measurements obtained from the first device.

Similarly, in the FIG. 300, it has been illustrated as the N-path out of 319 is directed to step 320, however, in some embodiments, the N-path out of 319 may change place with the Y-path out of 319, i.e. if in 319 it is determined that RRM is delegated, the method may continue in step 320.

In some embodiments, the steps 319-321 may be optional, and the method 300 may comprise the first device performing cellular measurements at a first frequency until a number of consecutive matchings have been reached, and then performing the cellular measurements at a second frequency, where the first frequency is higher than the second frequency (as is described in conjunction with FIG. 4).

Methods 100-300 described herein may reduce the power consumption of a power constrained device by offloading some of its cellular control/connection management measurements to a second device with less power constraints (such as a device which receives its power through a cable connected to a power grid, or can replenish power e.g. by charging batteries). However, as described above, the first device may in some embodiments not solely rely on the second device and further rely on that the received measurements are applicable to the first device. Hence matching of received and performed measurements may in some embodiments be carried out (as e.g. described in conjunction with FIGS. 2 and 3). However, if a number of consecutive matchings have been successful, the first device may reduce the matching frequency and rely more on the second device, as is illustrated in FIG. 4 by the table showing that in the beginning, matching is performed after each measurement but after three consecutive successful matchings (compare with method 300 and Y=Z=3) the frequency of performed matchings and thus cellular connection management measurements performed by the first device may be reduced. Hence, the first device may perform measurements M1-M3, but then only perform Measurements M6, M9, M12 and M15. Then the table illustrates a failed match (compare with steps 212 and 319 of method 200 and 300 respectively) and the first device reverts back to performing all cellular measurements instead of a subset of them.

Figure 5:
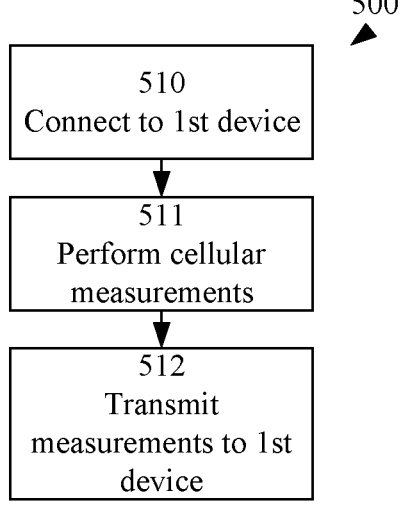
FIG. 5 is a flowchart illustrating example method steps according to some embodiments.

So far the embodiments and methods described herein have mainly been in the perspective of the first device having limited power supply or power resources. However, FIG. 5 illustrates a method 500 of a second device having less constrained power resources than the first device according to some embodiments.

Method 500 may be of a second communication device for power management of a first communication device, wherein the first communication device has first power resources and the second communication device has second power resources being less constrained than the first power resources. The method 500 may e.g. be carried out in conjunction with either of methods 100, 200 and 300 (taken on their own or combined). The second device may hence be the second device as described in conjunction with any of the previous FIGS. 1-4 and the first device may be the first device as described in conjunction with any of the previous FIGS. 1-4.

The method 500 starts in step 510 with the second device connecting to the first communication device over a non-cellular connection (compare with steps 111 and 312 of methods 100 and 300 respectively).

Then in step 511 the method continues with performing cellular connection management measurements associated with the first communication device through cellular communication with a network node (compare with step 112 of the method 100). In some embodiments, the connection management measurements may comprise one or more of Radio Resource Management, RRM, measurements; paging reception; cell search; network system information; measurement and selection; Random Access Channel, RACH, processes; and control signalling. The method 500 may then continue in step 512 with transmitting information associated with the performed connection management measurements to the first communication device through the non-cellular connection (compare with steps 113, 211, 312 of method 100, 200 and 300 respectively).

As elaborated on above, in some embodiments the second power resources receives power from a power grid. The second device may e.g. be connected to a power outlet which provides the second device with continuous power. In some embodiments, the second device may have a power source which may be replenished, the power resource may e.g. be a rechargeable battery.

In some embodiments, the method 500 may further comprise the second device performing connection management measurements while connected to the first communication device. The second device may perform connection management measurements regardless of whether it is connected over a non-cellular connection to the first device or not (it should also be noted that the second device could be connected to several first devices, i.e. several power constrained devices at the same time). The second device may transmit the outcome of the performed measurements directly to the first device upon a request from the first device and/or may in some embodiments broad cast information on the performed connection management measurements and/or the performed connection management measurements such that it may be intercepted by any of the first device(s) that are connected to the second device. Since the measurements are performed by the second device, they may not be applicable to the first device, and hence in some embodiments the first device may perform a matching procedure as described in accordance with any of FIGS. 2-4.

In some embodiments, the first device may refrain from performing matching and instead receive all of its cellular connection management measurements from the second device.

In some embodiments, the method 500 may further comprise performing Radio Resource Management, RRM, measurements and determining based on the RRM measurements neighbour-cell quality metrics and a need for a camping cell change or change of a tracking area. The first device may e.g. delegate RRM measurements to the second device (compare with step 315 of the method 300). By delegating it should be understood that the first device may either request the second device to perform RRM measurements, or the first device may simply use the RRM measurements which are performed by the second device regardless of the connection to the first device. Hence, the term delegating should in this disclosure be seen as the first device putting the responsibility of acquiring measurements on the second device either by request or simply through normal operation of the second device.

The method 500 may then in some embodiments comprise transmitting the neighbour-cell quality metrics to the first communication device (compare with step 315 of the method 300). The first device may e.g. request the second device to transmit the quality metrics to the first device, e.g. in the case when the first device trusts the measurements of the second device (compare with methods 200 and 300 and FIG. 4). In some embodiments, the second device may indicate that a cell change is needed to the first device, which first device performs the quality metrics as well.

In some embodiments, the second device may further carry out paging options for the first device as described in conjunction with e.g. FIG. 3.

Figure 6:
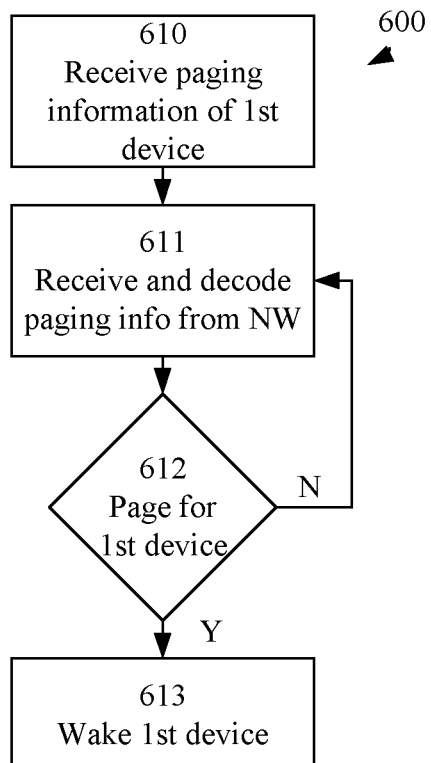
FIG. 6 is a flowchart illustrating example method steps according to some embodiments.

FIG. 6 illustrates and example method 600 of the second device. The method 700 may be combined with the method 500 (the method 600 may e.g. be comprised in step 511 of the method 500) and may further be carried out in conjunction with either of the methods 100-300. The second device and first device may thus be any of the second and first device as described in conjunction with any of the previous FIGS. 1-5.

The method 600 may start in step 610 with receiving from the first communication device information indicative of paging occasion information and a Paging Radio Network Temporary Identifier, P-RNTI, associated with the first communication device (compare with steps 316 and 318 of method 300). Then in step 611, the second device may receive and decode paging information over the cellular connection for the first communication device based on the received paging occasion information and P-RNTI. Hence, the second device may act as a stand in for the first device in view of the network node while the first device may conserve power in a power saving mode such as sleep mode or inactive mode.

The method 600 may then continue in step 612 with determining whether there is a paging message for the first communication device. When it is determined that there is not a paging message for the first device (N-path out of step 612) the method may loop back to step 611. When it is determined that there is a paging message for the first device, the method may continue in step 613 with transmitting an instruction to the first communication device to leave the power-saving mode to receive cellular control data. The first device may receive cellular control data either directly form the second device, or the first device may in some embodiments receive cellular control data by performing its own measurements towards the network node over a cellular connection. In some embodiments, the first device may both receive and perform own cellular control measurements in order to receive cellular control data.

In some embodiments, the method 600 may further comprise the second device performing a Random Access, RA, procedure for establishing a cellular Radio Resource Control, RRC, connection to the network node and transmitting cellular control data from the network node to the first communication device over the non-cellular connection.

Figure 7:
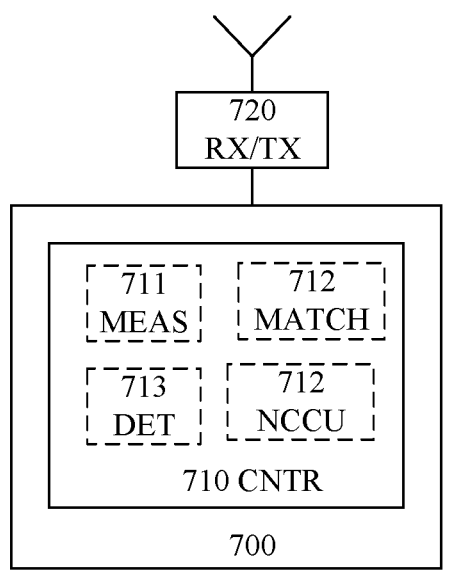
FIG. 7 is a block diagram illustrating an example arrangement according to some embodiments.

FIG. 7 illustrates an example arrangement 700 of a first communication device for power management, wherein the communication device has first power resources.

The arrangement 700 may e.g. be comprised in a first communication device as described in conjunction with any of the previous FIGS. 1-6, and be configured to carry out the methods 100-300 as described above.

The arrangement 700 may comprise controlling circuitry (CNTR) 710 and a transceiver circuit (RX/TX) 820. In some embodiments the transceiver circuit is a part of the controlling circuitry. The controlling circuitry 710 may further in some embodiments comprise a measurement unit (MEAS) 711, a matching unit (MATCH) 712, a determiner (DET) 713 and a non-cellular connection unit (NCCU) 712. The controlling circuitry may be configured to cause detection of a second communication device operating in a same area as the first communication device and having second power resources being less constrained than the first power resources. The controlling circuitry may then be configured to cause connection to the second communication device over a non-cellular connection (e.g. by causing the NNCU 714 to search for and connect to a second device) and cause delegation of the second communication device to perform cellular connection management measurements associated with the first communication device through cellular communication with a network node. The controlling circuitry may then be configured to cause (e.g. by causing the transceiver 720 to receive) reception of information associated with the mobility connection measurements from the second communication device through the non-cellular connection.

In some embodiments, the controlling circuitry is further configured to cause comparison of information associated with connection management measurements previously gathered by the first communication device and the received information associated with the mobility connection measurements (e.g. by causing the measuring unit perform and gather cellular measurements and provide them to the matching unit for matching). The controlling circuitry may also be configured to cause determination of whether the received information is applicable for the first communication device (e.g. by causing the determiner and or matching unit to perform the matching and/or determine whether there was a match).

In some embodiments, when it is determined that the received result is not applicable for the first communication device, the controlling circuitry is configured to cause disconnection from the second communication device and cause performance of cellular connection management measurements over the cellular connection to the network node (e.g. by causing the measurement unit to perform cellular connection management measurements). The controlling circuitry may be configured to cause search for a third communication device with less constrained power resources than the power resources of the first communication device for connecting to (e.g. by causing the NCCU).

In some embodiments, when it is determined that the received information is applicable for the first communication device, the controlling circuitry is configured to cause staying connected to the second communication device and reception of further information associated with connection management measurements from the second communication device over the non-cellular connection.

In some embodiments, the connection management measurements comprise one or more of Radio Resource Management, RRM, measurements; paging reception; cell search; network system information; measurement and selection; Random Access Channel, RACH, processes; and control signalling.

In some embodiments, the first communication device is an Internet of Things, IoT, or massive machine type communication, mMTC, device. In some embodiments, the first communication device is one of a smart phone, lap top, surf tablet, note book, computer etc.

In some embodiments, the first power resources are limited based on one or more of a size of a battery powering the first communication device, limited connectivity, available radio resources and physical location of the first communication device. By limited is to be taken a power resource that will deplete within a foreseeable future and which will not be replenished. Not limited, or less limited than a limited resource may e.g. be a power resource which receives power from a power grid or has a rechargeable power source and can hence be seen as being able to replenish and is thus not very much concerned with being power conservative.

In some embodiments, the controlling circuitry is configured to cause refraining from performing a subset of connection management measurements while connected to the second communication device. As noted above in conjunction with FIGS. 2-4, the first communication device may refrain from doing some measurements and instead allow and/or utilize measurements performed by a second communication device which has access to a greater power reserve or replenishable power compared to the first communication device.

In some embodiments, the controlling circuitry is configured to cause reception of an indication from the second communication device of a need for cell change or change of tracking area (e.g. by causing the transceiver circuit to receive). The controlling circuitry may be configured to cause using of the received metrics, or performing corresponding RRM measurements, for initiating a cell change or change of tracking area (e.g. by causing one or more of the determiner, measurement unit and matching unit).

In some embodiments, the indication is a neighbour-cell quality metrics obtained by the second communication device when the second communication device performs RRM measurements and determines a need for a camping cell change or change of a tracking area.

In some embodiments, the controlling circuitry is configured to cause informing of the second communication device of paging occasion information and a Paging Radio Network Temporary Identifier, P-RNTI, associated with the first communication device, wherein the P-RNTI enables the second communication device to receive and decode paging information for the first communication device (e.g. by causing the transceiver circuit to transmit). The controlling circuitry may in some embodiments be configured to cause the first communication device to entering into a power saving state and further cause reception of an instruction from the second communication device to leave the power-saving mode to receive cellular control data when the second communication device determines that there is a paging message for the first communication.

In some embodiments, the controlling circuitry is configured to cause reception of cellular control data from the second communication device through the non-cellular connection, wherein the second communication device performs a Random Access, RA, procedure for establishing a cellular Radio Resource Control, RRC, connection to the network node. Or, in some embodiments, the controlling circuitry is configured to cause establishment of the RRC connection to the network node by performing the RA procedure and reception of the cellular control data directly from the network node over the cellular connection.

In some embodiments, the cellular control data is broad casted system information.

In some embodiments, the non-cellular connection is one of a Bluetooth connection, a Bluetooth Low Energy, BLE, connection, a NFC connection, a Wi-Fi connection, a D2D-connection, a M2M-connection and a cable connection.

In some embodiments, a cellular connection is a connection with a network node using e.g. a LTE or NR network according to e.g. 3GPP standards.

Figure 8:
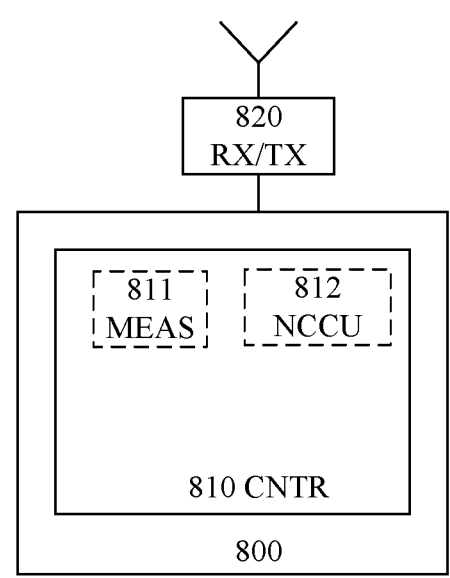
FIG. 8 is a block diagram illustrating an example arrangement according to some embodiments.

FIG. 8 illustrates an example arrangement 800 of a second communication device for power management of a first communication device, wherein the first communication device has first power resources and the second communication device has second power resources being less constrained than the first power resources.

The arrangement 800 may e.g. be comprised in a second communication device as described in conjunction with any of the FIGS. 1-7 and may further configured to cause or carry out any of the methods 500 or 600 separately or combined as previously described. The arrangement 800 comprises controlling circuitry (CNTR) 810 and transceiver circuit (RX/TX) 820. The controlling circuitry 910 may in some embodiments further comprise a measuring unit (MEAS) 811 and a non-cellular connection unit (NCCU) 812.

In some embodiment the controlling circuitry 810 may be configured to cause connection to the first communication device over a non-cellular connection (e.g. by causing the NCCU). The controlling circuitry 810 may further be configured to cause performance of cellular connection management measurements associated with the first communication device through cellular communication with a network node (e.g. by causing the measuring unit) and to cause transmission of information associated with the performed connection management measurements to the first communication device through the non-cellular connection (e.g. by causing one or more of the transceiver circuit and NCCU).

In some embodiments, the connection management measurements comprise one or more of Radio Resource Management, RRM, measurements; paging reception; cell search; network system information; measurement and selection; Random Access Channel, RACH, processes; and control signalling.

In some embodiments, the second power resources receives power from a power grid. The power resource is not shown in FIG. 8, but may e.g. be a rechargeable battery, power supply through a cable connected to a power outlet or be any other type of replenishable power source.

In some embodiments, the controlling circuitry is configured to cause performance of connection management measurements while connected to the first communication device (e.g. by causing the measuring unit to measure).

In some embodiments, the controlling circuitry is configured to cause performance of Radio Resource Management, RRM, measurements and determining based on the RRM measurements neighbour-cell quality metrics and a need for a camping cell change or change of a tracking area and transmission of the neighbour-cell quality metrics to the first communication device (e.g. by causing one or more of the measuring unit to measure and transceiver circuit to transmit).

In some embodiments, the controlling circuitry is configured to cause reception from the first communication device of information indicative of paging occasion information and a Paging Radio Network Temporary Identifier, P-RNTI, associated with the first communication device (e.g. by causing the transceiver circuit to transmit). The controlling circuitry may be further configured to cause reception and decoding of paging information over the cellular connection for the first communication device based on the received information, determination of whether there is a paging message for the first communication device and transmission of an instruction to the first communication device to leave the power-saving mode to receive cellular control data.

In some embodiments, the controlling circuitry is configured to cause performance of a Random Access, RA, procedure for establishing a cellular Radio Resource Control, RRC, connection to the network node. In some embodiments, the controlling circuitry may be further configured to cause transmission of cellular control data from the network node to the first communication device over the non-cellular connection. The cellular control data may e.g. be transmitted upon reception of a request for the cellular control data from the first device. The cellular control data may in some embodiments additionally or alternatively be transmitted as broad cast transmission which may be intercepted by any interested party.

The arrangement 800 may be comprised in a communication device. The communication device may e.g. be a smart phone, a mobile phone, a computer, a laptop, a note book, a surf tablet, a IoT-device, or a mMTC-device.

The embodiments described herein may e.g. be realised in various use cases. For example, a typical usage case may be mobile UEs that associated with transportation vehicles or other logistics contexts. One example of a device with restricted power supply may be a tracking unit attached to a package that most of the time is in transport vehicles (truck, train, etc.) or storage facilities that include an assisting device with less constrained power resources, but also needs to be able to connect independently to the cellular NW between different phases of transport or in the absence of an assisting device.

Both power constrained devices and devices with less power constrictions generally comprise a 2-5 G modem, RF transceiver for Bluetooth/Wi-Fi, CPU, memory, and a power source. At least two possible example cooperation configurations may be considered:

1) A first device(s) with a constrained power source is connected to a second device having a less constrained power source using an application-appropriate non-cellular communication technology, e.g. a low-power radio technology (e.g. Bluetooth, Wi-Fi, . . . etc.). Cellular mobility measurements in such case can be shared from the less constrained device and the constrained device(s) does not need to perform the mobility measurements (or may perform it more seldom). I.e. a constrained device can update its associated mobility parameters, e.g. neighbour-cell quality estimates, from the not so constrained device via the non-cellular communication technology. The data traffic from/to the constrained device can also be offload to the non-cellular communication technology. Normally the non-cellular connection between the constrained device and not so constrained device has a short distance with good SNR (signal to noise ratio); hence, synchronization can be easily done. That may in some embodiments involve sending the 3GPP packet within the message body of the communication protocol packet that is used between the constrained device and the not so constrained device. In some embodiments, this may involve updating the 3GPP standards to accommodate this application without utilizing a specific application or a vendor-software update. In other embodiments, e.g. 2) below, the approach is transparent to the NW and no standard changes are required.

2) A dedicated application (software) may be installed on the constrained device, that will be able to request or receive the 3GPP configuration updates from the not so constrained device, receive its specific data packets and also decode it. This is a way around modifying the 3GPP standards and the dedicated application can be installed on both the constrained and not so constrained devices via software updates, in which the constrained device would be able to poll 3GPP information from the not so constrained device and its associated data packets in a client-server relationship manner via any connection between the two devices. Security protocols may also be updated to accommodate such usage case.

Any configuration parameters that can be shared from the less constrained device to the more constrained device without interrupting the regular operation of the network are contemplated by the embodiments disclosed herein.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Figure 9:
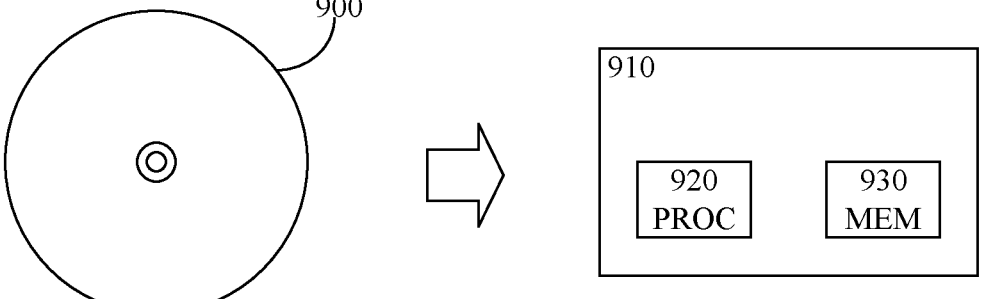
FIG. 9 is a schematic drawing illustrating an example computer program product according to some embodiments.

FIG. 9 illustrates a computer program product comprising a non-transitory computer readable medium (900) according to some embodiments. The non-transitory computer readable medium (900) has stored there on a computer program comprising program instructions. The computer program is configured to be loadable into a data-processing unit (910), comprising a processor (920) and a memory (930) associated with or integral to the data-processing unit. When loaded into the data-processing unit (910), the computer program is configured to be stored in the memory (930), wherein the computer program, when loaded into and run by the processor (920) is configured to cause the processor to execute method steps according to any of the methods described in conjunction with FIGS. 1-6.

According to some embodiments, a computer program product comprises a computer readable medium such as, for example, a diskette or a CD-ROM. The data-processing unit, which may, for example, be comprised in communication device such as a mobile terminal.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely for illustrative purpose and by no means limiting. Instead, all variations that fall within the range of the claims are intended to be embraced therein.

The invention claimed is:

1. A method for power management of a first communication device, wherein the communication device has first power resources, the method comprising:
  detecting a second communication device operating in a same area as the first communication device and having second power resources being less constrained than the first power resources;
  connecting to the second communication device over a non-cellular connection;
  delegating to the second communication device to perform cellular connection management measurements for the first communication device through cellular communication with a network node; and receiving information associated with the connection management measurements from the second communication device through the non-cellular connection.

2. The method according to claim 1, further comprising:
  comparing information associated with connection management measurements previously gathered by the first communication device and the received information associated with the connection management measurements;
  determining whether the received information is applicable for the first communication device.

3. The method according to claim 2, wherein when it is determined that the received information is not applicable for the first communication device, the method comprises:
  disconnecting from the second communication device;
  performing connection management measurements over the cellular connection to the network node; and
  searching for a third communication device with less constrained power resources than the power resources of the first communication device for connecting to.

4. The method according to claim 2, wherein when it is determined that the received information is applicable for the first communication device, the method comprises
  staying connected to the second communication device and receiving further information associated with connection management measurements from the second communication device over the non-cellular connection.

5. The method according to claim 1, wherein the connection management measurements comprise one or more of Radio Resource Management (RRM) measurements; paging reception; cell search; network system information reception; cell measurement and selection; Random Access Channel (RACH) processes; and control signaling.

6. The method according to claim 1, wherein the first communication device is an Internet of Things (IoT), Reduced Capability (RedCap), or massive machine type communication (mMTC) device.

7. The method according to claim 1, wherein the first power resources are limited based on one or more of a size of a battery powering the first communication device, limited connectivity, available radio resources and physical location of the first communication device.

8. The method according to claim 1, further comprising:
  refraining from performing a subset of connection management measurements while connected to the second communication device.

9. The method according to claim 1, wherein the cellular control data is broad casted system information.

10. The method according to claim 1, wherein the non-cellular connection is one of a Bluetooth connection, a Bluetooth Low Energy (BLE), connection, a NFC connection, a Wi-Fi connection, a D2D-connection, a M2M-connection and a cable connection.

11. The method according to claim 10, further comprising:
  performing mobility management measurements while connected to the first communication device.

12. A method of a second communication device for power management of a first communication device, wherein the first communication device has first power resources and the second communication device has second power resources being less constrained than the first power resources, the method comprising:
  connecting to the first communication device over a non-cellular connection;

performing cellular connection management measurements for the first communication device through cellular communication with a network node; and transmitting information associated with the performed connection management measurements to the first communication device through the non-cellular connection.

13. The method according to claim 12, wherein the connection management measurements comprise one or more of Radio Resource Management (RRM) measurements; paging reception; cell search; network system information; measurement and selection; Random Access Channel (RACH) processes; and control signaling.

14. The method according to claim 12, wherein the second power resources receives power from a power grid.

15. The method according to claim 12, further comprising:

performing Radio Resource Management (RRM) measurements and determining based on the RRM measurements neighbour-cell quality metrics and a need for a camping cell change or change of a tracking area; and transmitting the neighbour-cell quality metrics to the first communication device.

16. A first communication device for power management, wherein the first communication device has first power resources, the first communication device comprising controlling circuitry configured to cause:

detection of a second communication device operating in a same area as the first communication device and having second power resources being less constrained than the first power resources;

connection to the second communication device over a non-cellular connection;

delegation of the second communication device to perform cellular connection management measurements associated with the first communication device through cellular communication with a network node; and reception of information associated with the cellular connection management measurements from the second communication device through the non-cellular connection.

17. A second communication device for power management of a first communication device, wherein the first communication device has first power resources and the second communication device has second power resources being less constrained than the first power resources, the second communications device comprising controlling circuitry configured to cause:

connection to the first communication device over a non-cellular connection;

performance of cellular connection management measurements associated with the first communication device through cellular communication with a network node; and transmission of information associated with the performed connection management measurements to the first communication device through the non-cellular connection.

* * * * *